United States Patent Office 3,287,353
Patented Nov. 22, 1966

3,287,353
DISPERSANTS USED IN THE PREPARATION OF HYDROXYETHYL CELLULOSE
Joseph P. Stidham, Hopewell, Va., assignor to Hercules Incorporated, a corporation of Delaware
No Drawing. Filed Apr. 23, 1964, Ser. No. 362,193
3 Claims. (Cl. 260—231)

The present invention relates to a process of preparing hydroxyethyl cellulose and more particularly to a slurry process of preparing hydroxyethyl cellulose wherein a mixture of isopropyl alcohol and tertiary butyl alcohol is employed as a dispersant.

Some of the prior art refers to the alcohols as "diluents" when used as disclosed herein, whereas other prior art uses the term "dispersants." Perhaps the latter is a better term when used in slurry processes, of which the present invention is an example.

For the sake of brevity the following designations will be used sometimes hereinafter: IPA is isopropyl alcohol, TBA is tertiary butyl alcohol, HEC is hydroxyethyl cellulose, EO is ethylene oxide, V. is very, Sl. is slightly.

The purpose of this paragraph is to explain the use herein and in the prior art of the term "M.S." There are three hydroxyl groups in each anhydroglucose unit in the cellulose molecule. M.S. is the average number of moles of reactant combined with the cellulose per anhydroglucose unit. Thus, it might appear on first thought that the M.S. of hydroxyalkyl cellulose ethers cannot exceed three, however this is not true and the M.S. may be considerably higher than three. The reason for this is that each time a hydroxyalkyl group is introduced into the cellulose molecule, and additional hydroxyl group is formed which itself is capable of hydroxyalkylation. As a result of this, side chains of considerable length may form on the cellulose molecule. Thus, it will be seen that the extent to which the M.S. of hydroxyalkyl cellulose ethers may exceed three depends on the extent to which side chains are formed.

It is known to use either isopropyl alcohol or tertiary butyl alcohol as a dispersant in slurry processes of preparing hydroxyethyl cellulose ethers. Comparing the two, isopropyl alcohol gives ethers of about equal solution properties but the etherification efficiency of the process is substantially lower. Surprisingly, it has been found in accordance with the present invention that the use of isopropyl alcohol-tertiary butyl alcohol in admixture gives even better solution properties than either isopropyl alcohol or tertiary butyl alcohol alone and an etherification efficiency comparable to that obtained with tertiary butyl alcohol alone.

The properties of aqueous solutions of hydroxyethyl cellulose (referred to in the art and herein as "solution properties") are conventionally measured in terms of fibers, turbidity, and percent insolubles. These properties and processes for determining them are defined hereinafter. Good solution properties are quite important for many uses of hydroxyethyl cellulose. These uses include, e.g., films or coatings, cosmetics, textiles, laundry aids, paper additives, pharmaceuticals, and many uses as thickeners in general.

The following examples, wherein percent and parts are by weight unless otherwise indicated, illustrate various embodiments of the present invention but they are not intended to limit the invention beyond the scope of the appended claims. Temperature and the particular manner or order of mixing the materials are not critical and they may be varied, as is well known in the art. Such conditions have been well known in the art for many years and are applicable in the present invention. However, the following represents a typical procedure and this procedure was used in the examples given hereinafter, unless otherwise indicated.

Isopropyl alcohol, tertiary butyl alcohol, water, aqueous sodium hydroxide solution and cellulosic material were added to a reactor. The temperature of the reactor was brought to 30° C. and held for 30 minutes. Ethylene oxide was added to the reactor and the temperature raised to 50° C. in 30 minutes and held 90 minutes, then raised to 80° C. and held 30 minutes. The reactor was cooled, the sodium hydroxide neutralized and the resulting hydroxyethyl cellulose product was purified with 80% aqueous acetone, dehydrated with 100% acetone, and dried. In these examples the various ratios to dry cellulose in parts by weight were: dispersant/cellulose ratio of 10.4/1, NaOH/cellulose ratio of 0.32/1 and water/cellulose ratio of 1.8/1.

All viscosities herein were measured with a standard Brookfield Synchro-Lectric LVF viscometer on 2% aqueous solutions at 25° C., unless otherwise indicated. The amount of each dispersant used in the dispersant mixture is defined herein as percent by weight of said mixture.

Further details appear in Table 1 hereinafter.

TABLE 1

Preparation of HEC variable: IPA/TBA ratio

| Example | Percent By Weight | | EO/Cell.[1] Ratio | M.S. | 2% Visc., c.p.s. | Fibers | Turbidity | Percent Insolubles | Percent EO Efficiency [2] |
|---|---|---|---|---|---|---|---|---|---|
| | IPA | TBA | | | | | | | |
| 1 | 0 | 100.00 | 0.679 | 1.67 | 6,700 | 4+ | V. Hazy | 1.4 | 66.8 |
| 2 | 1.05 | 98.95 | 0.676 | 1.65 | 7,000 | 4+ | Hazy | 1.6 | 66.3 |
| 3 | 2.10 | 97.90 | 0.679 | 1.64 | 7,100 | 4 | Sl. Hazy | 0.4 | 65.6 |
| 4 | 7.85 | 92.15 | 0.679 | 1.57 | 7,900 | 3 | Clear | 0.3 | 62.8 |
| 5 | 10.00 | 90.00 | 0.679 | 1.56 | 6,600 | 2+ | do | 0.3 | 62.4 |
| 6 | 100.00 | 0 | 1.121 | 2.05 | 1,640 | 5+ | V. Hazy | 1.2 | 49.7 |
| 7 | 10.00 | 90.00 | 0.907 | 2.12 | [3] 2,460 | 2 | Clear | Nil | 63.5 |

[1] Dry cellulose basis.

[2] EO Efficiency = $\dfrac{100 \times \text{M.S. Found}}{\text{Moles Ethylene Oxide} / \text{Moles Cellulose}}$

[3] 1%.

From the foregoing examples, it will be readily seen that the process of the present invention gives hydroxyethyl cellulose having solution properties substantially superior to such products prepared by prior art methods, and at the same time it enables an etherification efficiency comparable to that obtained in the best prior art process known.

The foregoing examples are for the sake of illustration purposes only and can be varied considerably within the scope of the present invention in accordance with the teachings of the prior art, as the artisan will appreciate.

The amount of isopropyl alcohol in the isopropyl alcohol-tertiary butyl alcohol mixture is important, and it is expressed herein as percent by weight of the total isopropyl alcohol-tertiary butyl alcohol mixture. The improvement in solution properties is not as high as desired when using below about 2% isopropyl alcohol, and the etherification efficiency begins to decrease rather sharply as the amount of isopropyl alcohol exceeds about 25%. The preferred range is approximately 5%–10% isopropyl alcohol.

Any hydroxyethylating agent may be used including, e.g., ethylene oxide, glycide, epichlorohydrin, butadiene monoxide, ethylene chlorohydrin, and the like, and mixtures thereof.

Although the present invention is applicable to the preparation of hydroxyethyl cellulose ethers which are soluble in aqueous alkali as well as those which are soluble in water, by far the greater quantity of hydroxyethyl cellulose ethers used today are water soluble. Of course, the solubility of such ethers is dependent on their M.S. value. Generally, those hydroxyethyl cellulose ethers having an M.S. of below about 1.0 are referred to as alkali soluble and those having an M.S. of about 1 and above are referred to as water soluble. For most uses it has been found that an M.S. range of approximately 1.0–3.5, preferably 1.5–2.5, is more applicable.

In general the amount of dispersant (i.e. isopropyl alcohol-tertiary butyl alcohol mixture) may be about 2–50 parts per part cellulose, preferably about 7–25 parts per part cellulose. The dispersant may be added in the anhydrous form or it may be added in the aqueous form. Of course, if it is added in the aqueous form, due allowance must be made so that the reaction mixture has the desired total amount of water.

For economic reasons, usually the alkali employed will be sodium hydroxide. However any of the strong alkali hydroxides, including potassium hydroxide, are suitable. Any amount of alkali may be used as long as it does not render the hydroxyethyl cellulose product soluble in the reaction mixture. Usually, the alkali/cellulose ratio will be about 0.05–10, preferably 0.2–0.5 part per part cellulose.

Usually the water/cellulose ratio will be about 1.2–2.5, preferably 1.6–2 parts per part cellulose.

As will be understood in the art, reaction temperatures and other conditions for the hydroxyethylation reaction may be varied within wide limits. For example, the etherification reaction temperature may be about 20° C.–150° C. and the reaction time varied correspondingly, being relatively long at a low temperature and substantially shorter at a high temperature. The preferred reaction temperature is about 30° C.–80° C.

As pointed out hereinbefore, the hydroxyethyl cellulose product of the present invention is obtained in substantially the same particulate form as the starting cellulosic material. The product is recovered in a simple manner merely by draining off, centrifuging, pressing, or the like, the reaction medium. The product is readily purified by neutralizing the alkali and washing with a non-solvent for the product, e.g. 70%–80% aqueous acetone. The purified product may then be dried, preferably below about 90° C.

The cellulosic material may be any appropriate raw material such as chemical cotton, cotton linters, or wood pulp of the type conventionally used in chemical reaction. The cellulosic material may be bulk dried, sheet dried, pretreated with alkali, or otherwise prepared for reduction to particles of the desired size. The cellulosic material may be ground in an attrition mill or similar device to the particle size desired, or it may be shredded, fluffed, or otherwise subdivided. In any of these forms, the cellulosic material is in a particulate form suitable for the purposes of this invention.

"Fibers" as disclosed herein was measured by the following procedure:

Fiber rating is based on an arbitrary set of standards well known in this art. The scale for fibers is as follows, the solution quality becoming better as the fiber rating number decreases.

Solution quality:                              Fiber rating
    Worst _____ 5+
    Better _____ 5
    Better _____ 4
    Better _____ 3
    Best _____ 2+

As will be apparent from Table 1 hereinbefore, turbidity was measured simply by visual observation.

"Percent insolubles" was determined by screening a 1%–2% aqueous concentration of the hydroxyethyl cellulose through a 325-mesh screen. Any material which did not pass through the screen was classified as insolubles.

The following procedure was used:

(1) Obtain a tare weight on the 325-mesh screen.

(2) Support the screen with a clamp and ring stand. Place a water nozzle inside the screen so that water is sprayed tangentially across the screen. The water should wash the entire screen.

(3) Slowly pour the solution of hydroxyethyl cellulose in water through the screen.

(4) Dry the screen for ½ hour at 105° C. Cool and weigh.

(5) Calculation:

Percent insolubles =
$$\frac{\text{Wt. of screen residue} \times 100}{\text{Wt. of dry sample which was in the solution}}$$

As many apparent and widely different embodiments of this invention may be made without departing from the spirit and scope thereof, it is to be understood that the invention is not limited to the specific embodiments thereof except as defined in the appended claims.

What I claim and desired to protect by Letters Patent is:

1. Process of preparing hydroxyethyl cellulose comprising agitating cellulosic material in particulate form in a mixture of alkali, water, a hydroxyethylating agent and a liquid dispersant consisting essentially of isopropyl alcohol and tertiary butyl alcohol in admixture, and obtaining the hydroxyethyl cellulose thus produced in substantially the same particulate form as the starting cellulosic material, the isopropyl alcohol-tertiary butyl alcohol mixture consisting of about 2%–25% by weight thereof of isopropyl alcohol.

2. Process of preparing hydroxyethyl cellulose comprising dispersing cellulosic material in particulate form in a mixture of alkali, water and a liquid dispersant consisting essentially of isopropyl alcohol and tertiary butyl alcohol in admixture, and agitating the resulting dispersion in the presence of a hydroxyethylating agent, and thereby obtaining the hydroxyethyl cellulose thus produced in substantially the same particulate form as the starting cellulosic material, the isopropyl alcohol-tertiary butyl alcohol mixture consisting of about 5%–10% by weight thereof of isopropyl alcohol.

3. Process of preparing hydroxyethyl cellulose comprising dispersing cellulosic material in particulate form in a mixture of sodium hydroxide, water, and a liquid dispersant consisting essentially of isopropyl alcohol and tertiary butyl alcohol in admixture, and agitating the dispersion in the presence of ethylene oxide at a temperature of about 20° C.–150° C., and thereby obtaining the hydroxyethyl cellulose thus produced in substantially the same particulate form as the starting cellulosic material, the isopropyl alcohol-tertiary butyl alcohol mixture consisting of about 2%–25% by weight thereof of isopropyl alcohol.

References Cited by the Examiner

UNITED STATES PATENTS

| | | | |
|---|---|---|---|
| 2,572,039 | 10/1951 | Klug et al. | 260—231 |
| 2,682,535 | 6/1954 | Broderick | 260—231 |
| 2,875,473 | 3/1959 | Mitchell et al. | 260—231 |
| 3,045,007 | 5/1962 | Mitchell et al. | 260—231 |
| 3,131,177 | 4/1964 | Klug et al. | 260—231 |

LEON J. BERCOVITZ, *Primary Examiner.*

R. W. MULCAHY, *Assistant Examiner.*